March 22, 1927.
J. S. BURWELL
SHOCK ABSORBER
Filed Jan. 8, 1926
1,621,579
Fig. 1.
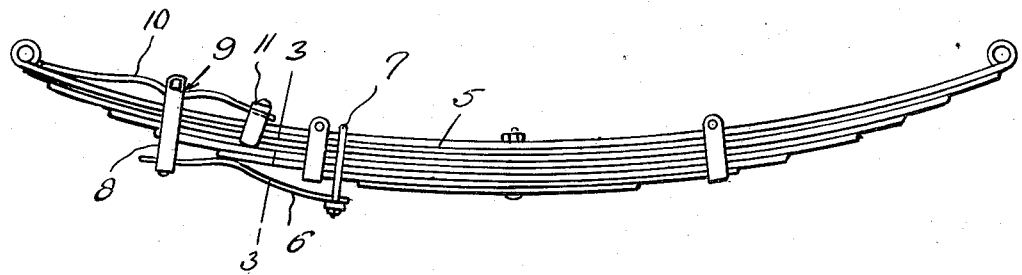
Fig. 2.
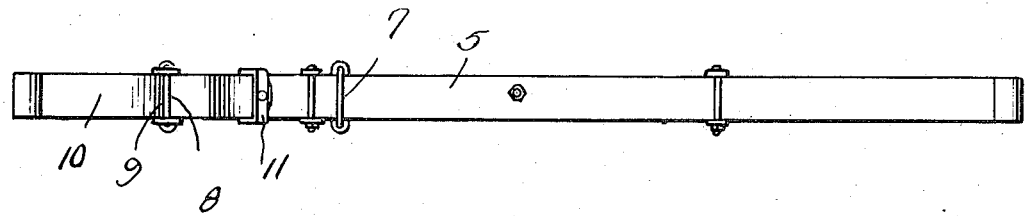
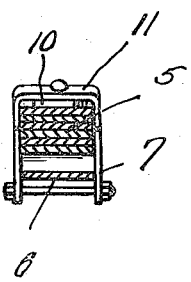
Fig. 3.
Inventor
J. S. Burwell,
By Clarence A. O'Brien
Attorney Patented Mar. 22, 1927.

1,621,579

UNITED STATES PATENT OFFICE.

JAY SAMUEL BURWELL, OF SHARON, PENNSYLVANIA.

SHOCK ABSORBER.

Application filed January 8, 1926. Serial No. 80,036.

The present invention relates to a shock absorber and has for its prime object to improve upon the structure shown in my pending application bearing Serial No. 59,863, filed October 1st, 1925.

An important object of the invention is to provide a shock absorber wherein a bowed plate is applied to the convex side of a semi-elliptical spring adjacent one end thereof and to provide a cushioning means in connection with one end of said plate so as to prevent the breaking of the U-bolt or spring clip used to engage this end of the plate with the semi-elliptical spring.

Another important object of the invention is to provide a shock absorber of the above nature which is capable of being easily and quickly applied and adjusted in relation to the spring and one which possesses a simple structure that will prove strong and durable in use.

With the above and numerous other objects in view as will appear as the description proceeds, the invention resides in certain novel features of construction, and in the combination and arrangement of parts as will be hereinafter more fully described and claimed.

In the drawing:—

Figure 1 is an elevation of a semi-elliptical spring showing my shock absorber associated therewith.

Figure 2 is a top plan view thereof, and

Figure 3 is a section taken transversely therethrough substantially on the line 3—3 of Figure 1.

Referring to the drawing in detail, it will be seen that 5 designates any well known type of semi-elliptical spring. The numeral 6 designates a plate which is curved so that its intermediate portion engages the convex side of the spring 5. One end of the plate 6 is engaged with the U-bolt 7, while the other end of the plate 6 has a spring clip 8 engaged therewith and the sides thereof straddle the spring so that the end bolt may engage in the intermediate notch portion 9 of a bowed plate 10 having its extremities engaged with the concave side of the spring, the inner end being provided with a U-shaped clip 11 which straddles the frame.

The notched or reversely curved intermediate portion 9 of the plate 10 is normally spaced from the concave side of the spring. It will therefore be seen that when the spring rebounds both the plates 6 and 10 will tend to absorb the shock and considerable strain will be taken off of the clip 8 as would be the case where no plate 10 were used, and the clip 8 was engaged directly with the spring.

It is thought that the construction, utility, and advantages of the invention will now be clearly apparent without a more detailed description thereof. The present embodiment of the invention has been disclosed in detail since in actual practice it attains the features of advantage enumerated as desirable in the statement of the invention and the above description. Numerous changes in the details of construction, and in the combination and arrangement of parts may be resorted to without departing from the spirit or scope of the invention as hereinafter claimed.

Having thus described the invention, what I claim as new and desire to secure by Letters Patent is:

1. A shock absorber of the class described including a bowed plate having its intermediate portion adapted to abut the convex side of a spring and its ends spaced therefrom, a U-shaped bolt at one end of the plate for engagement with the spring, a U-shaped clip at the other end of the plate for straddling the spring, a second bowed plate having its ends in abutment with the concaved side of the spring and having its intermediate portion curved inwardly and spaced from the spring, means engaging the U-shaped clip with the intermediate portion of the second plate.

2. A shock absorber of the class described including a bowed plate having its intermediate portion adapted to abut the convex side of a spring and its ends spaced therefrom, a U-shaped bolt at one end of the plate for engagement with the spring, a U-shaped clip at the other end of the plate for straddling the spring, a second bowed plate having its ends in abutment with the concaved sides of the spring and having its intermediate portion curved inwardly and spaced from the spring, means engaging the U-shaped clip with the intermediate portion of the second plate, one end of the second plate being provided with U-shaped clip adapted to straddle the spring.

3. A shock absorber of the class described including a bowed plate having its intermediate portion adapted to abut the convex side of a spring and its ends spaced therefrom, a second bowed plate having its ends in abutment with the concave side of the spring and its intermediate portion curved inwardly and spaced from the spring, means engaging said intermediate portion of the second plate and one end of the first plate, means engaging one end of the second plate with the spring, and means for engaging the other end of the first plate with the spring.

In testimony whereof I affix my signature.

JAY SAMUEL BURWELL.